US009915927B2

(12) United States Patent
Kobayashi

(10) Patent No.: US 9,915,927 B2
(45) Date of Patent: Mar. 13, 2018

(54) SYSTEM AND METHOD FOR ACCOMMODATING POWER AND NON-TRANSITORY COMPUTER-READABLE MEDIUM STORING PROGRAM

(71) Applicant: NEC Corporation, Tokyo (JP)

(72) Inventor: Noriaki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 287 days.

(21) Appl. No.: 14/434,948

(22) PCT Filed: Aug. 13, 2013

(86) PCT No.: PCT/JP2013/004845
§ 371 (c)(1),
(2) Date: Apr. 10, 2015

(87) PCT Pub. No.: WO2014/057599
PCT Pub. Date: Apr. 17, 2014

(65) Prior Publication Data
US 2015/0253744 A1 Sep. 10, 2015

(30) Foreign Application Priority Data
Oct. 11, 2012 (JP) .................. 2012-225987

(51) Int. Cl.
G05D 3/12 (2006.01)
G05B 11/01 (2006.01)
(Continued)

(52) U.S. Cl.
CPC ............ *G05B 11/012* (2013.01); *G05B 15/02* (2013.01); *H02J 3/46* (2013.01); *H02J 13/0096* (2013.01)

(58) Field of Classification Search
CPC ... G05B 11/012; G05B 15/02; H02J 13/0096; H02J 3/46
(Continued)

(56) References Cited

U.S. PATENT DOCUMENTS

2008/0167756 A1* 7/2008 Golden .................. G05B 15/02
700/297
2012/0233060 A1 9/2012 Terano et al.

FOREIGN PATENT DOCUMENTS

JP 2003-324850 11/2003
JP 2004-15882 1/2004
(Continued)

OTHER PUBLICATIONS

Ortolaza et al., "Reliability of Intelligent Power Routers", IEEE, 2004, pp. 838-843.*
(Continued)

*Primary Examiner* — Robert Fennema
*Assistant Examiner* — Thomas Stevens
(74) *Attorney, Agent, or Firm* — Finnegan, Henderson, Farabow, Garrett & Dunner, L.L.P.

(57) ABSTRACT

A power management apparatus (120) includes management information storage unit (121) capable of storing a condition under which each consumer management apparatus (100) receives power (first condition) and a condition under which each consumer management apparatus (100) supplies power (second condition), power control unit (123) for supplying or received power to or from the consumer management apparatuses (110), and information control unit (122) for controlling the consumer management apparatus (110) and power control unit (123). Each consumer management apparatus (110) includes a distributed power supply (111), a load (112), and control unit (113) that controls the distributed power supply 112. When the information control unit (122)

(Continued)

detects that one consumer management apparatus (110) has activated the first condition, it requests another consumer management apparatus (100) activating the second condition to supply power and supplies the power to the first consumer management apparatus (110) via the power control unit (123).

13 Claims, 8 Drawing Sheets

(51) Int. Cl.
      *H02J 3/46*     (2006.01)
      *G05B 15/02*   (2006.01)
      *H02J 13/00*   (2006.01)

(58) Field of Classification Search
      USPC .................................................. 700/295, 297
      See application file for complete search history.

(56) References Cited

FOREIGN PATENT DOCUMENTS

| JP | 2004-282898 | 10/2004 |
|---|---|---|
| JP | 2010-220428 | 9/2010 |
| JP | 2011-101534 | 5/2011 |

OTHER PUBLICATIONS

Irizarry-Rivera et al., "Intelligent Power Routers: Distributed Coordination for Electricity Energy Processing Networks", IEEE, 2010, pp. 47-85.*

International Search Report dated Sep. 17, 2013 in corresponding PCT International Application, 4 pages.

International Search Report dated Sep. 17, 2013 in corresponding PCT International Application, 5 pages.

\* cited by examiner

| CONSUMER TABLE | POWER NETWORK TABLE | ACCOMMODATION CONTROL TABLE |
|---|---|---|
| • CONTRACTOR IDS (A-1)<br>• DISTRIBUTED POWER SUPPLY IDS (A-2)<br>• INFORMATION ABOUT CONSIDERATION OF RECEIVED POWER (OPTION FEE) (A-3)<br>• INFORMATION ABOUT RECEIVED POWER (OPTION) (A-4)<br>• TYPES OF DISTRIBUTED POWER SUPPLIES (A-5)<br>• MAXIMUM GENERATED ENERGY OF DISTRIBUTED POWER SUPPLIES (A-6) | • STATES OF POWER SUPPLIES (B-1)<br>• DISTANCES (B-2)<br>• POWER ACCOMMODATION INFORMATION<br>  • POWER TRANSMISSION SOURCES/DESTINATIONS (B-31)<br>  • ACCOMMODATED ENERGY (B-32)<br>  • ACCOMMODATION PERIODS (B-33) | • POWER TRANSMISSION SOURCE PRIORITY TABLE (C-1)<br>• POWER TRANSMISSION DESTINATION PRIORITY TABLE (C-2) |
| 1211 | 1212 | 1213 |

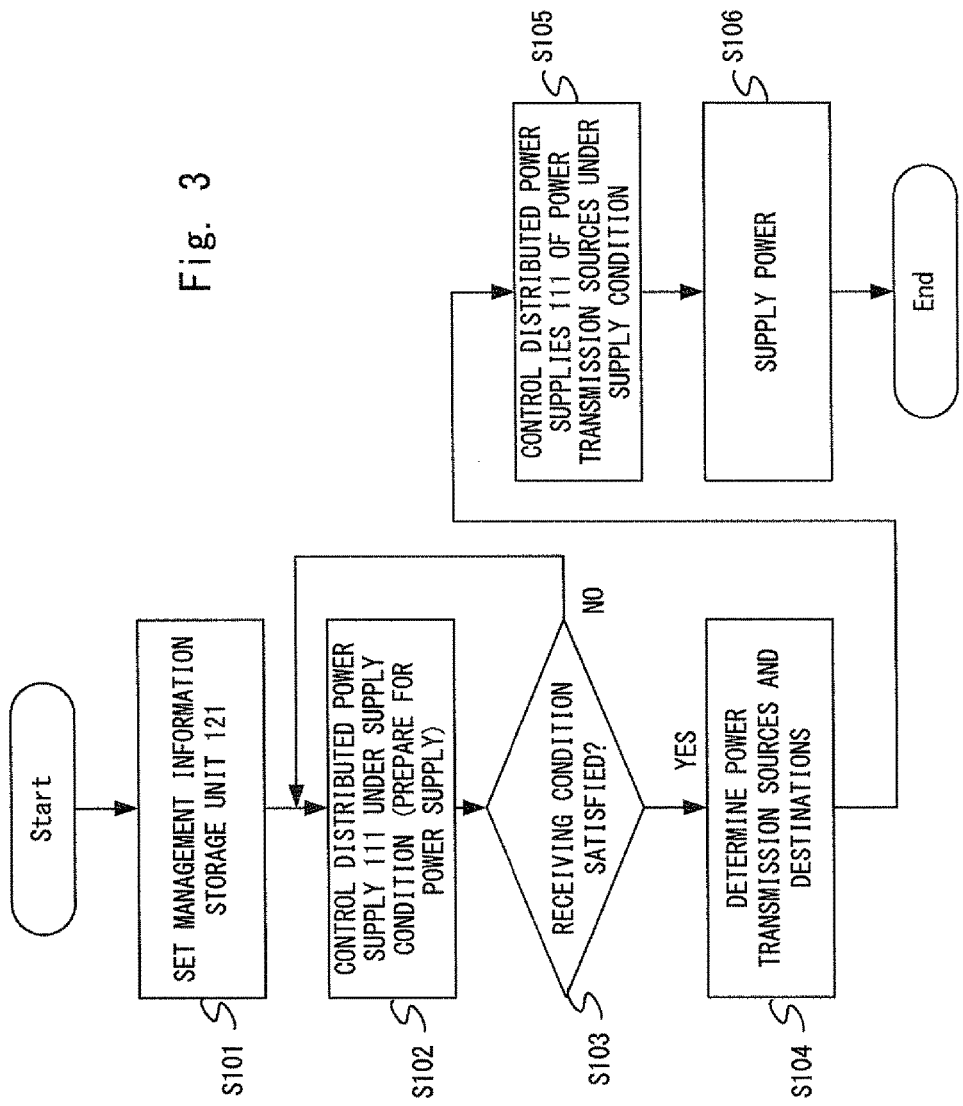

SYSTEM AND METHOD FOR ACCOMMODATING POWER AND NON-TRANSITORY COMPUTER-READABLE MEDIUM STORING PROGRAM

CROSS-REFERENCE TO RELATED PATENT APPLICATIONS

This application is a National Stage Entry of International Application No. PCT/JP2013/004845, filed Aug. 13, 2013, which claims priority from Japanese Patent Application No. 2012-225987, filed Oct. 11, 2012. The entire contents of the above-referenced applications are expressly incorporated herein by reference.

TECHNICAL FIELD

The present invention relates to a system and method for accommodating power and a non-transitory computer-readable medium storing a program. For example, the invention relates to a technology which accommodates power quickly and flexibly.

BACKGROUND ART

There have been proposed systems in which suppliers equipped with distributed power plants accommodate power to consumers who need power.

For example, Patent Literature 1 discloses that, in a power system in which power supplier sites and power consumer sites are connected together, the power supplier sites accommodate power to the power consumer sites in case of an emergency and that during the emergency, the electric utility (power company) operates and controls its power plants so that the same time-same amount principle is satisfied at small cost within the power system.

CITATION LIST

Patent Literature

Japanese Unexamined Patent Application Publication No. 2004-282898

SUMMARY OF INVENTION

Technical Problem

However, in a configuration where consumers and suppliers accommodate power via a power system managed by a power company, as described in Patent Literature 1, it is necessary to adjust the demand-supply balance in the power system as described above. Accordingly, power accommodation is performed less flexibly and is difficult to perform quickly in case of an emergency.

Further, in such a configuration, the consumers and suppliers must previously make predetermined contracts with the power company, thereby making flexible and quick power accommodation more difficult.

Furthermore, in such a configuration, money is typically paid as the value of the supply and receipt of power. Accordingly, it is difficult to realize flexible power accommodation contracts, such as one under which if one supplier supplies power to another consumer, the supplier receives power from another supplier in case of an emergency.

The present invention has been made to solve these problems, and an object thereof is to provide a system and method for accommodating power and a non-transitory computer-readable medium storing a program which can accommodate power quickly and flexibly.

Solution to Problem

A power accommodation system according to the present invention controls comprising: a plurality of consumer management apparatuses forming an autonomously controlled grid; and a power management apparatus that accommodates power among the consumer management apparatuses, wherein the power management apparatus comprises: management information storage means for storing at least one of first and second conditions in such a manner that the at least one condition is associated with each of the consume management apparatuses, the first condition being a condition under which each of the consumer management apparatuses receives power, the second condition being a condition under which each of the consumer management apparatuses supplies power, a power control means that supplies or receives power to or from the consumer management apparatuses; and information control means for controlling the consumer management apparatuses and the power control means, when the information control means detects that a first consumer management apparatus has satisfied the first condition, the information control means requests a second consumer management apparatus satisfying the second condition to supply power, the power control means supplies power supplied from the second consumer management apparatus to the first consumer management apparatus, the consumer management apparatuses each comprise at least one of a distributed power supply that generates power and a load that consumes power, and control means forming controlling the distributed power supply, and the control means controls power supply to the power management apparatus based on a request from the information control means and power reception from the power control means.

A method for accommodating power according to the present invention includes a step of detecting, by information control means of a power management apparatus, that a first consumer management apparatus has satisfied a first condition which is a condition under which the first consumer management apparatus receives power; a step of, when a second consumer management apparatus satisfies a second condition which is a condition under which the second consumer management apparatus supplies power, requesting, by the information control means of the power management apparatus, the second consumer management apparatus to supply power; and a step of receiving, by power control means of the power management apparatus, the power from the second consumer management apparatus and supplying the power to the first consumer management apparatus.

A non-transitory computer-readable medium storing a program according to the present invention is a non-transitory computer-readable medium storing a program for causing a computer to perform the above method.

Advantageous Effects Of Invention

According to the present invention, there can be provided a system and method for accommodating power and a non-transitory computer-readable medium storing a program which can accommodate power quickly and flexibly.

BRIEF DESCRIPTION OF DRAWINGS

FIG. 2 is a diagram showing the configuration of a management information storage unit 121.

FIG. 3 is a diagram showing a process performed by the power accommodation system 100 according to the first embodiment.

DESCRIPTION OF EMBODIMENTS

Figure 1:
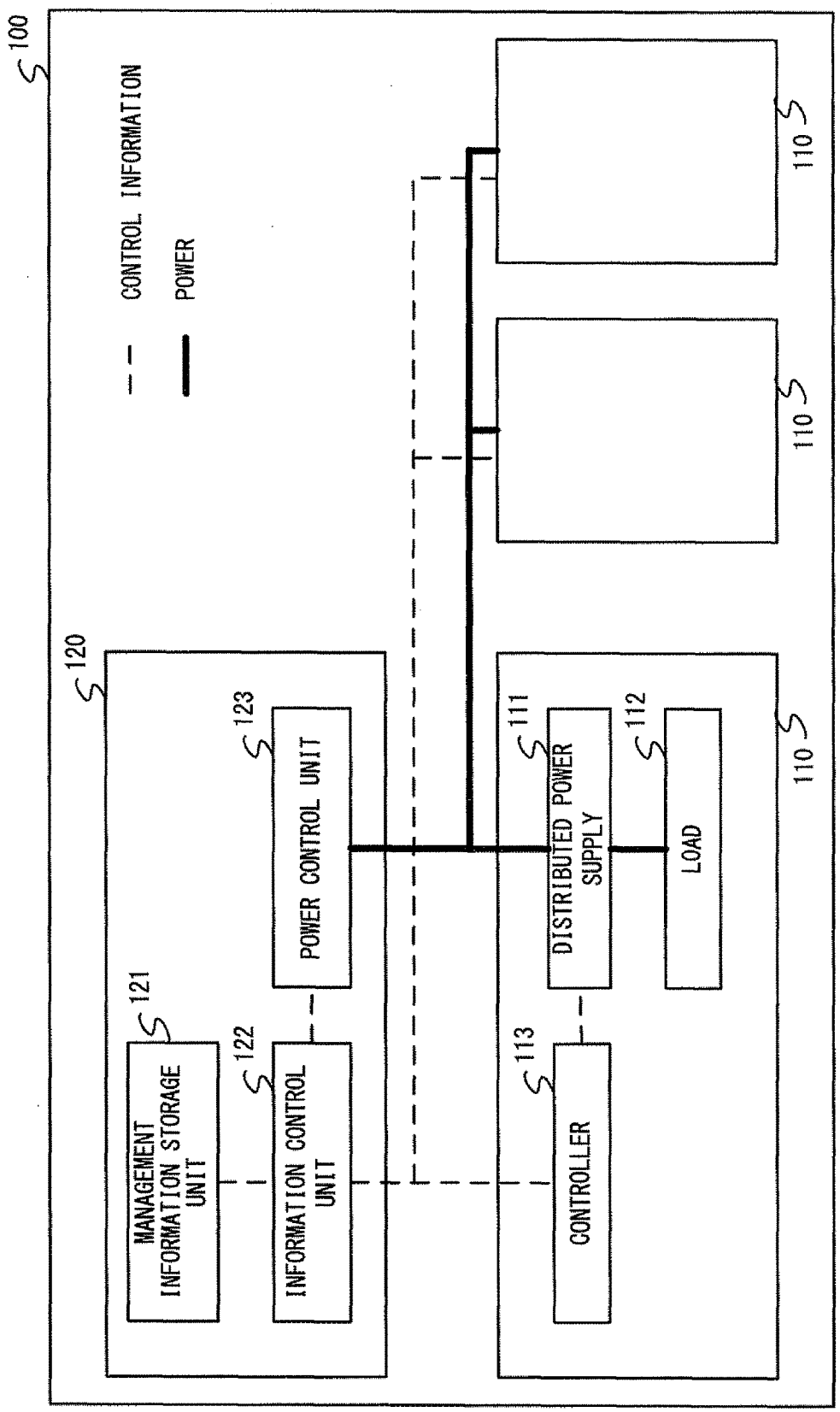
FIG. 1 is a diagram showing the configuration of a power accommodation system 100 according to a first embodiment.

Now, a specific embodiment of the present invention will be described in detail with reference to the drawings.
First Embodiment FIG. 1 is a block diagram showing the configuration of a power accommodation system 100 according to a first embodiment.

A power accommodation system 100 includes multiple consumer management apparatuses 110 and a power management apparatus 120. While the power management apparatus 120 is typically connected to a power system (bulk power system) of a power company or the like at an interconnection and supplies power from the bulk power system to the consumer management apparatuses 110, it can also control power accommodation within the power accommodation system 100 independently of the bulk power system. The power accommodation system 100 is, for example, a microgrid. A microgrid is equipped with renewable energy plants or the like, independently of power supply from a bulk power system managed by a power company. A microgrid consists of multiple power systems (grids) which are each controlled by consumer management apparatuses 110 in an autonomous and delivered manner, and power for multiple consumers in each grid is managed within the grid. A consumer management apparatus 110 is an apparatus that manages received power by a consumer in the microgrid. Since each consumer management apparatus 110 operates autonomously, power control is performed stably.

Multiple consumer management apparatuses 110 in one grid may accommodate power within the same grid or may accommodate power between different grids. Each consumer management apparatus 110 includes at least one of a distributed power supply 111 and a load 112, and a controller 113. Each consumer management apparatus 110 may include multiple distributed power supplies 111 and multiple loads 112.

Examples of the distributed power supply 111 include various types of plants, apparatuses, and the like which generate power, including gas engine/gas turbine power plants, photovoltaic power plants, wind power plants, biomass power plants, fuel cells, and storage batteries (when discharging). The distributed power supply 111 is connected to the load 112 and the power control unit 123 of the power management apparatus 120 so that power can be transmitted or received therebetween.

Examples of the load 112 include various types of facilities, apparatuses, and the like which consume power. A storage battery (when charging) also acts as the load 112. The load 112 is connected to the distributed power supply 111 and the power control unit 123 of the power management apparatus 120 so that power can be transmitted or received therebetween.

The controller 113 controls the output of the distributed power supply 111 in accordance with an instruction from the power control unit 123 of the power management apparatus 120. The controller 113 is typically a computer including a storage unit that stores a program and the like, a processor that performs processing in accordance with the program, and an input/output unit that transmits or receives information to or from the power control unit 123 or distributed power supply 111. The controller 113 is connected to the distributed power supply 111, the load 112, and the power control unit 123 of the power management apparatus 120 so that communication can be performed therebetween.

The power management apparatus 120 includes a management information storage unit 121, an information control unit 122, and the power control unit 123.

The management information storage unit 121 stores the profiles of the consumer management apparatuses 110 (attribute values such as the generated energy, the set values such as the power accommodation conditions, or the like). The profiles are typically databases which are logically constructed on the storage unit. Details of the management information storage unit 121 will be described later.

The information control unit 122 has functions, including a function of setting the profiles of the consumer management apparatuses 110 in the management information storage unit 121 and a function of detecting whether a predetermined condition has been satisfied, based on the profiles and instructing the power control unit 123 to cause the controller 113 of a predetermined consumer management apparatus 110 to supply a predetermined energy.

The power control unit 123 has functions, including a function of supplying power received from the distributed power supply 111 of one consumer management apparatus 110 or the bulk power system to the load 112 of another consumer management apparatus 110 and a function of, in accordance with an instruction from the information control unit 122, instructing the controller 113 of a predetermined consumer management apparatus 110 to supply a predetermined energy.

The information control unit 122 and power control unit 123 are typically computers which each include a storage unit that stores a program and the like, a processor that performs processing in accordance with the program, and an input/output unit that transmits or receives information to or from the controllers 113 of the consumer management apparatuses 110.

Referring now to FIG. 2, the management information stored in the management information storage unit will be described.

The management information storage unit 121 includes three tables: a consumer table 1211, a power network table 1212, and an accommodation control table 1213.

The consumer table 1211 is a table storing the profiles of the consumer management apparatuses 110. When a new consumer management apparatus 110 joins the power accommodation system 100, a new entry is made in the consumer table 1211. The consumer table 1211 includes the following entries. Contractor IDs (A-1) are identifiers (ID) for identifying the consumer management apparatuses 110. Distributed power supply IDs (A-2) are IDs for identifying the distributed power supplies 111 of the consumer management apparatuses 110. If one contractor has multiple distributed power supplies 111, multiple distributed power supply IDs corresponding to the distributed power supplies 111 are associated with the contractor ID of the contractor. Information about the value of received power (premium) (A-3) is information indicating what the respective consumer management apparatuses 110 should supply to the power management apparatus 120 as the values of the respective contracted received energy (to be discussed later) and indicating the respective supply conditions. Information about received power (option) (A-4) is information indicating the energy that the respective consumer management apparatuses 110 can receive from the power management apparatus 120 (the contracted received energy) and indicating the respective reception conditions. The types of the distributed power supplies (A-5) are information indicating data about the respective distributed power supplies 111 (e.g., whether each power supply generates natural energy, inverter conversion efficiency, or the like). The maximum generated energy of the distributed power supplies (A-6) are information indicating the maximum energy that the respective distributed power supplies 111 can generate.

Note that the concepts "option" and "premium" described in the information about received power (option) (A-4) and the information about the value of received power (premium) (A-3) are approximately synonymous with the concepts "option" and "premium" in financial transactions. That is, the concept "option" refers to the right of one consumer management apparatus 110 to receive a predetermined energy from the power management apparatus 120 when a predetermined condition is satisfied in the future. The concept "premium" refers to what the consumer management apparatus 110 delivers to the power management apparatus 120 as the value of the right.

The power network table 1212 is a table storing information about the power networks related to the power accommodation system 100 and includes the following entries. The states of power supplies (B-1) are information indicating whether the respective distributed power supplies 111 and the respective power plants of the bulk power system are operating or whether power can be currently received from these power supplies (whether these power supplies are operating, the states of the switches, or the like). The distances (B-2) are information indicating the power transmission distances from each consumer management apparatus 110 to the other consumer management apparatuses 110. Power accommodation information (B-31 to B-33) is information which is set when one consumer management apparatus 110 accommodates power to another consumer management apparatus 110 and includes power transmission sources/destinations (B-31), the C, and the accommodation periods (B-33).

The accommodation control table 1213 is a table storing information for determining the power transmission sources and destinations when accommodating power. The accommodation control table 1213 includes a power transmission source priority table (C-1) and a power transmission destination priority table (C-2). The power transmission source priority table (C-1) is a table storing the contractor IDs of consumer management apparatuses 110 as candidate power transmission sources with priorities thereof which are previously recorded. The power management apparatus 120 determines the power transmission sources on the basis of the priorities defined in the power transmission source priority table (C-1). The power transmission destination priority table (C-2) is a table storing the contractor IDs of consumer management apparatuses 110 as candidate power transmission destinations with priorities thereof which are previously recorded. When there is a need to determine the relative merits of power transmission destinations, the power management apparatus 120 determines the power transmission destinations on the basis of the priorities defined in the power transmission destination priority table (C-2). Examples where there is a need to determine the relative merits of power transmission destinations include a case where the total energy supplied from the power transmission sources falls below the total energy to be supplied to the power transmission destinations and a case where there are differences among the degrees of stability of power supplied from the multiple power transmission sources. Note that the accommodation control table 1213 may store other parameters available to determine the power transmission sources and destinations, if necessary.

The priorities in the power transmission source priority table (C-1) and those in the power transmission destination priority table (C-2) may be determined based on various factors. For example, a consumer which is assigned a high priority in the power transmission source priority table (C-1) may be assigned a high priority also in the power transmission destination priority table (C-2). Relative merits may also be assigned to the priorities in the power transmission destination priority table (C-2) on the basis of details of the information about the value of received power (premium) (A-3), for example, the quantity of value.

Next, referring to FIG. 3, a process in which the power accommodation system 100 accommodates power will be described.

As a precondition for power accommodation, it is assumed that details of power accommodation agreement (power accommodation contract) in the power accommodation system 100 are previously registered in the management information storage unit 121. Described below are details of a power accommodation contract which are previously registered in the management information storage unit 121.

Each consumer operating a consumer management apparatus 110 previously sets information about received power (option) and information about the value of received power (premium). As the information about received power (option), the consumer sets the energy that the consumer management apparatus 110 can receive from the power management apparatus 120 (the contracted received energy), and the reception condition. As the information about the value of received power (premium), the consumer sets what the consumer management apparatus 110 should supply to the power management apparatus 120 as the value of the contracted received energy, and the supply condition.

The contracted received energy in the information about received power (option) refers to the energy that the consumer management apparatus 110 receives from the power management apparatus 120 when the reception condition (to be discussed later) is satisfied. For example, the consumer can set, as the contracted received energy, the maximum energy required to operate the load 112 of the consumer management apparatus 110. Thus, if the energy generated by the distributed power supply 111 of the consumer management apparatus 110 is lost, for example, due to a trouble such as an accident or power failure, the energy required to operate the load 112 can be acquired.

The reception condition in the information about received power (option) refers to a condition that the consumer management apparatus 110 should satisfy in order to receive the contracted received energy from the power management apparatus 120. For example, the consumer can set, as the reception condition, an event such as a stop of the distributed power supply 111 of the consumer management apparatus 110. As will be described later, the power management apparatus 120 can detect a stop of the distributed power supply 111 by periodically managing the alive or dead state of the distributed power supply 111.

In addition to the above example, the reception condition may include any events detectable by the power management apparatus 120, including a power failure in the consumer management apparatus 110, an abnormal event in the bulk power system, a request for a charge of the storage battery, and arrival of the scheduled execution time of an event requiring a large energy.

What should be supplied as the information about the value of received power (premium) is what the consumer management apparatus 110 should deliver to the power management apparatus 120 as the value of reception of the contracted received energy when the reception condition is satisfied. For example, the consumer can set an agreement under which the consumer management apparatus 110 supplies a predetermined energy (the contracted supply energy) to the power management apparatus 120. In this case, the consumer management apparatus 110 has an obligation to supply the contracted supply energy to the power management apparatus 120 when the supply condition (to be discussed later) is satisfied. Accordingly, in normal times, when the supply condition is yet to be satisfied, the consumer management apparatus 110 must make a preparation so that it can immediately start to supply the contracted supply energy once the supply condition is satisfied.

In addition of the above example, what should be supplied as the value may be, for example, payment of money from the consumer to the operator of the power management apparatus 120. In this case, the consumer management apparatus 110 does not need to make a particular preparation in normal times, when the supply condition is not satisfied.

The supply condition in the information about the value of received power (premium) is a condition under which the consumer management apparatus 110 should make a supply to the power management apparatus 120 as the value. For example, the supply condition may be issuance of a power supply request to the consumer management apparatus 110 by the power management apparatus 120. More specifically, when the power management apparatus 120 detects that one of the consumer management apparatuses 110 has satisfied its reception condition in the power accommodation system 100 and thus there has occurred a need for power accommodation in the power accommodation system 100, it may issue a power supply request to another consumer management apparatus 110.

The information about received power (option) (A-4) and information about the value of received power (premium) (A-3) described above are registered in the consumer table 1211 of the management information storage unit 121 in a manner associated with the corresponding contractor ID (A-1) and distributed power supply ID (A-2) (S101).

Next, there will be described a process in which the power accommodation system 100 performs control under a power accommodation contract.

The power management apparatus 120 performs steps S102 and S103 on the consumer management apparatuses 110 included in the power accommodation system 100. Steps S102 to S103 are steps performed in normal times, when the supply condition is yet to be satisfied in any of the consumer management apparatuses 110.

By controlling the controller 113 of each consumer management apparatus 110, the information control unit 122 of the power management apparatus 120 causes the consumer management apparatus 110 to make a preparation so that the consumer management apparatus 110 can immediately supply what it should supply as the value once the supply condition in the information about the value of received power (premium) is satisfied (S102). For example, the controller 113 makes such preparation by adjusting the output of the distributed power supply 111 or load 112. Note that step S102 need not be performed if what should be supplied as the value is that unrelated to the operation of the consumer management apparatus 110, such as payment of money.

The information control unit 122 periodically checks whether any consumer management apparatus 110 has satisfied the reception condition in the information about received power (option) (S103).

When any consumer management apparatus 110 satisfies its reception condition and thus the power management apparatus 120 must supply power to the consumer management apparatus 110 under the corresponding power accommodation contract, the power management apparatus 120 performs steps S104 to S106.

The information control unit 122 of the power management apparatus 120 then determines, from the other consumer management apparatuses 110, one or more consumer management apparatuses 110 (power transmission sources) which should supply power to the consumer management apparatus 110 (power transmission destination) which has satisfied the reception condition (S104). For example, the information control unit 122 may determine the consumer management apparatuses 110 of contractors ID having higher priorities as the power transmission sources, with reference to the power transmission source priority table (C-1) in the accommodation control table 1213. When the information control unit 122 refers to the information about the value of received power (premium) (A-3) associated with the contractors ID of the power transmission sources and the information about received power (option) associated with the contractor ID of the power transmission destination, if the energy supplied by the power transmission sources falls below the contracted received energy of the power transmission destination, the information control unit 122 may additionally sequentially determine, as power transmission sources to compensate for the lacking energy, consumer management apparatuses 110 of other contractors ID having lower priorities in the power transmission source priority table (C-1). The power transmission sources may also be determined based on any other parameters, such as the power transmission distance (B-2).

The information control unit 122 of the power management apparatus 120 then instructs the controllers 113 of the consumer management apparatuses 110 determined as the power transmission sources to supply the assigned energy (S105). In this case, the contracted supply energy of the respective power transmission sources serve as the upper limits of the energy assigned to the respective power transmission sources. In response to the instructions, the controllers 113 of the power transmission sources acquire the assigned energy, for example, by adjusting the output of the respective distributed power supplies 111 or loads 112 and then transmits power to the power control unit 123 of the power management apparatus 120.

The power control unit 123 of the power management apparatus 120 transmits power supplied from the power transmission sources to the consumer management apparatus 110 serving as the power transmission destination (S106). The power supply to the power transmission destination under the power accommodation contract is continued until the reception condition of the power transmission destination becomes unsatisfied. For example, if a stop of the distributed power supply 111 is the reception condition, the power supply can be continued until the restoration of the distributed power supply 111 is detected through the alive/dead state check. If the holding period of any event is the reception condition, the power supply can be continued until the event holding period ends.

When there is a need to assign relative merits to the power transmission destinations, the power management apparatus 120 may determine the power transmission destinations on the basis of the priorities defined in the power transmission destination priority table (C-2). For example, if the total energy supplied from the power transmission sources falls below the total energy to be supplied to the power transmission destinations, the power management apparatus 120 may assign the transmission energy preferentially to consumers having higher priorities in the power transmission destination priority table (C-2). If there are differences among the degrees of stability of power supplied from multiple power transmission sources, the power management apparatus 120 may assign power transmission sources having higher degrees of stability preferentially to consumers having higher priorities in the power transmission destination priority table (C-2). The degrees of stability of supply power may be determined, for example, based on the types of the distributed power supplies (A-5).

In the present embodiment, the power management apparatus 120 controls power accommodation completely independently of the bulk power system. That is, in response to a demand from one consumer management apparatus 110, the power management apparatus 120 accommodates, to that consumer management apparatus 110, power supplied from another consumer management apparatus 110 completely independently of the bulk power system. Thus, flexible and quick power accommodation can be realized without having to adjust the demand-supply balance in the bulk power system.

Further, in the present embodiment, the management information storage unit 121 manages details of the power accommodation contracts independently of the bulk power system, and the information control unit 122 performs the above-mentioned accommodation control with reference to the management information storage unit 121. Thus, flexible and quick power accommodation can be realized without consumers having to previously making a predetermined contract with the power company.

Further, in the present embodiment, the management information storage unit 121 can manage various patterns of power accommodation contract and therefore the information control unit 122 can perform the above accommodation control with reference to the management information storage unit 121 thus configured, as well as using various information communication technologies. Thus, flexible power accommodation contracts can be made.

Second Embodiment

In a second embodiment of the present invention, there will be described the configuration and operation of the power accommodation system 100 under a specific power accommodation contract.

Figure 4:
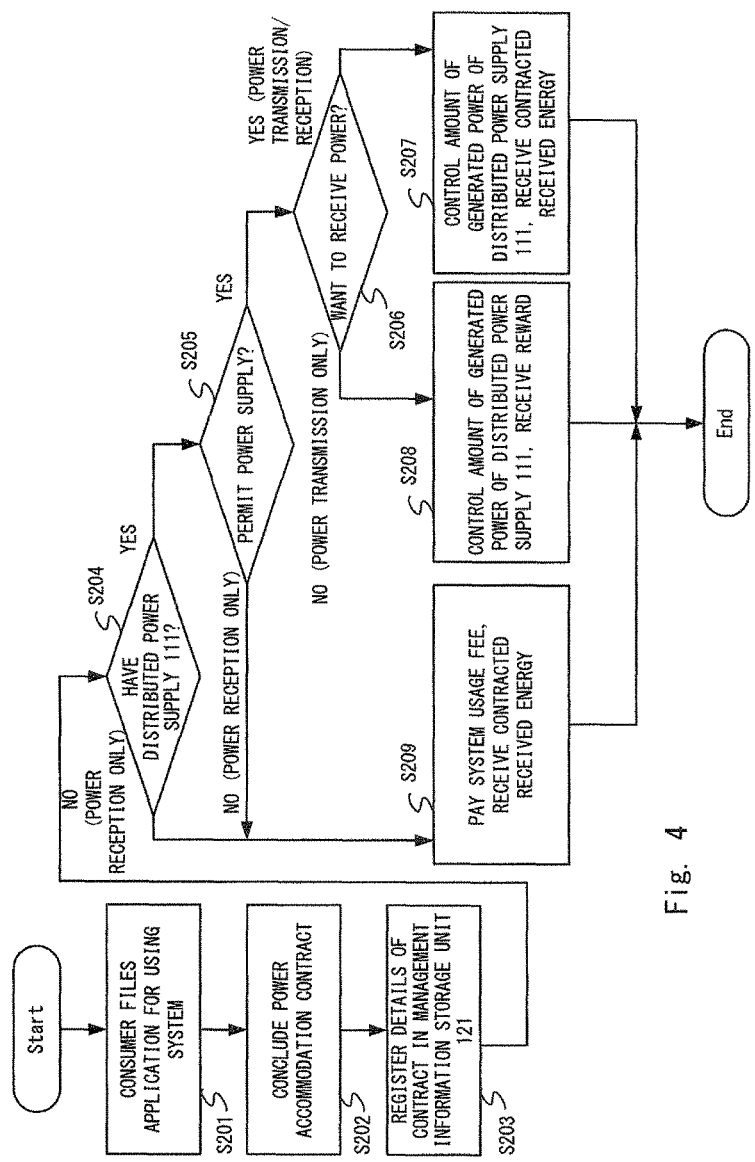
FIG. 4 is a diagram showing a power accommodation contract conclusion flow in a second embodiment.

First, referring to FIG. 4, a power accommodation contract conclusion flow will be described.

A consumer who wants to join the power accommodation system 100 files an application for using the system with the operator of the power management apparatus 120 (S201). At this time, the consumer provides the type of the distributed power supply (A-5) and the maximum generated energy of the distributed power supply (A-6) to the operator of the power management apparatus 120. If the consumer has no distributed power supply, it provides information indicating the fact.

When the operator of the power management apparatus 120 accepts this system use application, a power accommodation contract is concluded (S202). The operator of the power management apparatus 120 then assigns a contractor ID (A-1) to the consumer. The operator also assigns a distributed power supply ID (A-2) to a distributed power supply included in a consumer management apparatus 110 operated by the consumer. The operator then registers the information A-2 to A-6 of the consumer in the consumer table 1211 of the management information storage unit 121 in a manner associated with the contractor ID (A-1) (S203).

Then, the consumer management apparatus 110 of the consumer, whose wants to join the power accommodation system 100, is connected to the power management apparatus 120 so that power transmission and reception and communication can be performed therebetween. Thus, the power management apparatus 120 can monitor the distributed power supply 111 and load 112 of the consumer management apparatus 110 and control them via the controller 113.

The information control unit 122 of the power management apparatus 120 calculates the distances from the newly joining consumer management apparatus 110 to the other consumer management apparatuses 110 (B-2) and registers them in the power network table 1212. The information control unit 122 also periodically monitors the state of the power supply (B-1) of the distributed power supply 111 and registers the state in the power network table 1212.

Details of the information about the value of received power (premium) (A-3) and the information about received power (option) (A-4) in the power accommodation contract are determined through the following flow. First, if the consumer has no distributed power supply 111 and only a load 112 (S204), the premium is the payment of the system usage fee. When the consumer pays the specified system usage fee to the operator of the power management apparatus 120, information indicating that the value (what should be supplied as the value) is payment of the fee and that the payment (supply condition) is complete is written as the information about the value of received power (premium) (A-3) (S209).

Even if the consumer has a distributed power supply 111 (S204), if the consumer does not permit power supply from the distributed power supply 111 (S205), the premium is the payment of the system usage fee. Also in this case, when the consumer pays the specified system usage fee to the operator of the power management apparatus 120, information indicating that the value (what should be supplied as the value) is payment of the fee and that the payment (supply condition) is complete is written as the information about the value of received power (premium) (A-3) (S209).

If the consumer has a distributed power supply 111 (S204) and if the consumer permits power supply from the distributed power supply 111 (S205), the premium is preferably supply of the contracted supply energy in response to a power supply request. In this case, the contracted supply energy (what should be supplied as the value) and a notification of a power supply request (supply condition) are written as the information about the value of received power (premium) (A-3) (S209).

If the consumer wants to receive power from the power management apparatus 120 (S206), the option is preferably reception of the contracted received energy from the power management apparatus 120 by the consumer management apparatus 110. In this case, the contracted received energy and the reception condition are written as the information about received power (option) (A-4) (S207). In this case any reception condition may be agreed between the operator of the power management apparatus 120 and the consumer. On the other hand, if the consumer does not want power supply from the power management apparatus 120 (S206), the option may be payment of a fee from the operator of the power management apparatus 120 to the consumer (S208).

Now, assume that one consumer has made a power accommodation contract P as described below in accordance with the above contract conclusion flow.

Power Accommodation Contract P

Information about the value of received power (premium) (A-3):

Consideration to be supplied: the consumer management apparatus 110 supplies a maximum energy Y (the contracted supply energy) to the power management apparatus 120.

Supply condition: the power management apparatus 120 notifies the consumer management apparatus 110 of a power supply request.

Information about received power (option) (A-4):

The contracted received energy: the consumer management apparatus 110 receives a maximum energy Z from the power management apparatus 120.

Reception condition: a stop of the distributed power supply 111 of the consumer management apparatus 110

Figure 5:
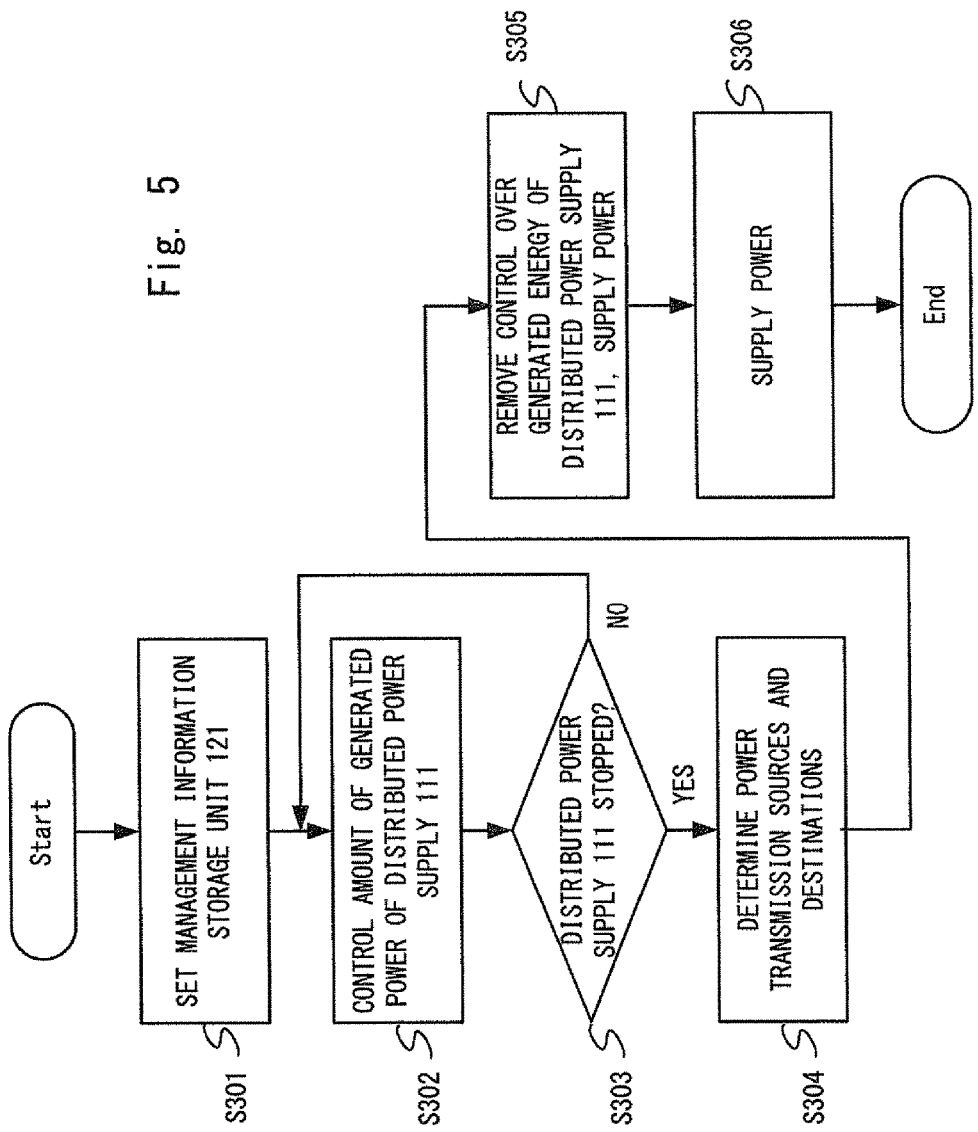
FIG. 5 is a diagram showing a process performed by a power accommodation system 100 according to a second embodiment.

Referring to FIG. 5, there will be described the configuration and operation of the power accommodation system 100 under the power accommodation contract P. First, the information included in the power accommodation contract P, for example, the information about the value of received power (premium) (A-3) and information about received power (option) (A-4) is stored in the management information storage unit 121 (S301).

The power management apparatus 120 then performs steps S302 and S303 on the consumer management apparatus 110. Note that steps S302 and S303 are steps in normal times, when the reception is yet to be satisfied in any of the consumer management apparatuses 110 included in the power accommodation system 100.

By controlling the controller 113 of the consumer management apparatus 110, the information control unit 122 of the power management apparatus 120 causes the consumer management apparatus 110 to make a preparation so that the consumer management apparatus 110 can supply the maximum energy Y (the contracted supply energy) to the power management apparatus 120 when notified of a power supply request (supply condition) (S102). Specifically, if the maximum energy in the specification of the distributed power supply 111 is X, the controller 113 controls the distributed power supply in normal times, when the supply condition is yet to be satisfied, so that power is generated using X-Y as the upper limit. In other words, the amount of generated power is controlled to X-Y in normal times, when the supply condition is yet to be satisfied. In other words, Y is reserved as a reserve generating capacity in normal times, where the supply condition is yet to be satisfied, so that the energy Y can be supplied to the power management apparatus 120 at any time. By making such a preparation, the controller 113 can supply the contracted supply energy Y to the power management apparatus 120 when the supply condition is satisfied, by increasing the amount of generated power of the distributed power supply 111 to up to X.

In addition the above example, the controller 113 may previously store a predetermined energy Y in a storage battery (not shown) or the like and, when the supply condition is satisfied, may supply the maximum energy Y from the storage battery. Further, if the consumer management apparatus 110 can receive the energy W from the bulk power system, the controller 113 may control the energy used by the load 112 to W-Y or less in normal times, when the supply condition is yet to be satisfied and, when the supply condition is satisfied, may cause the power management apparatus 120 to receive the maximum energy Y from the bulk power system.

The information control unit 122 periodically checks whether the consumer management apparatus 110 has not satisfied the reception condition in the information about received power (option) (S303). In the present embodiment, the reception condition is a stop of the distributed power supply 111. Accordingly, the information control unit 122 instructs the controller 112 to periodically check whether the distributed power supply 111 is operating normally. In accordance with this instruction, the controller 112 transmits a control signal to the distributed power supply 111, checks the operating state of the distributed power supply 111 by observing presence or absence of a response to the control signal, and notifies the information control unit 122 of whether there is an abnormality. If the information control unit 122 receives a response indicating an abnormality from the controller 112 or does not receive a normal response, it detects that the distributed power supply 111 has stopped, that is, the reception condition has been satisfied. Alternatively, the following procedure may be employed: the controller 112 or distributed power supply 111 autonomously periodically checks the alive or dead state of the distributed power supply 111 and records the check result in the state of the power supply (B-1) of the power network table 1212; on the other hand, the information control unit 122, if there is a record indicating an abnormality in the state of the power supply (B-1) or if there has been no normal record over a predetermined period of time, detects that the distributed power supply 111 has stopped, that is, the reception condition has been satisfied.

If the consumer management apparatus 110 satisfies the reception condition, that is, the power management apparatus 120 must supply power to the consumer management apparatus 110 under the power accommodation contract, the power management apparatus 120 performs steps S304 to S306 below.

The information control unit 122 of the power management apparatus 120 determines, from the other consumer management apparatuses 110, one or more consumer management apparatuses 110 (power transmission sources) which should supply power to the consumer management apparatus 110 (power transmission destination) which has satisfied the reception condition (S304). The method for determining the power transmission sources is similar to step S104 of the first embodiment.

The information control unit 122 of the power management apparatus 120 instructs the controllers 113 of the consumer management apparatuses 110 determined as the power transmission sources to supply the assigned energy (S305). At this time, the contracted amounts of supply power of the respective power transmission sources serve as the upper limits of the energy assigned to the power transmission sources. In response to the instructions, the controllers 113 of the power transmission sources acquire the assigned energy, for example, by adjusting the output of the distributed power supplies 111 or loads 112 and then transmit power to the power control unit 123 of the power management apparatus 120.

The power control unit 123 of the power management apparatus 120 then transmits power supplied from the power transmission sources to the consumer management apparatus 110 serving as the power transmission destination (S306). The power supply to the power transmission destination under the power accommodation contract is continued until the reception condition becomes unsatisfied. In the present embodiment, a stop of the distributed power supply 111 is the reception condition. Accordingly, the power transmission destination can continuously receive the contracted received energy until the restoration of the distributed power supply 111 is detected through the alive/dead state check.

When relative merits need to be assigned to the power transmission destinations, the power management apparatus 120 can select the power transmission destinations on the basis of the priorities defined in the power transmission destination priority table (C-2), as described in the first embodiment. Further, in the second embodiment, for example, higher priorities may be assigned to consumers who are under contracts including control over the amount of generated power as the information about the value of received power (premium) (A-3) in a power transmission destination priority table (C-2) than to consumers who pay the system usage fee. Thus, for example, preferential treatment can be given to consumers who are estimated to make greater contributions to the power accommodation system 100. As seen above, more flexible power accommodation can be performed in accordance with details of the contracts.

In the present embodiment, the amount of generated power of the consumer management apparatus 110 is controlled in normal times, when supply condition is yet to be satisfied, whereas the consumer management apparatus 110 can reliably receive the contracted received energy when the reception condition is satisfied. Thus, it is possible to construct power networks which are strong to power failure or the like. Further, the control over the amount of generated power and the contracted received energy are handled equivalently in the power accommodation contract. Thus, it is possible to realize a fair power accommodation system where the control over the amount of generated power is utilized for the consumer in the form of the contracted received energy.

Third Embodiment

In a third embodiment, there will be described the configuration of a power accommodation system realized by using power routers.

First, the power routers will be described. A power router refers to a device which receives a control instruction from a controller and transmits or receives power to or from another received power in accordance with the control instruction. Specifically, a power router has one or more power input terminals and one or more power output terminals and outputs power received from one or more power input terminals to one or more specified power output terminals in specified amounts.

The power output terminals of the power router are connected to power input terminals of one or more other power routers via power transmission lines so that power can be transmitted or received therebetween. Further, the power router is connected to the other power routers and a controller via communication lines so that communication can be performed therebetween. The controller determines power transmission paths in accordance with a predetermined algorithm and transmits, to the power routers, control instructions in which power output terminals from which to output power and the energy are specified. Further, the controller can gather, from the power routers, the power transmission results (power transmission destinations, the amounts of transmitted power, the power transmission times, efficiencies, etc.) based on the control instructions and store them as power transmission histories.

In a power transmission network using the power routers described above, the controller can determine an optimum power transmission path using a known network path control technique. The controller can also determine a path using the homogeneity of power. Specifically, if a power router A transmits the energy X to a power router B and the power router A transmits the energy Y (Y<X) to the power router B, it is only necessary to transmit the difference power X-Y between the power routers A and B. As seen above, the power trading under the contract, and the actual amount of transmission power and transmission route may not necessarily correspond to each other.

In a power transmission network using power routers, it is possible to set power transmission/reception points, as well as power transmission paths therebetween. For example, by causing a consumer management apparatus 110 at the power transmission point to accommodate power to a consumer management apparatus 110 at the received power point without passing power through a substation or power management apparatus 220, it is possible to reduce the frequency of power conversion or further reduce the power transmission distance. Such a power transmission network has a power loss reduction effect compared to a power transmission network not using power routers. This applies to both power accommodations within the same system and that between different systems.

Figure 6:
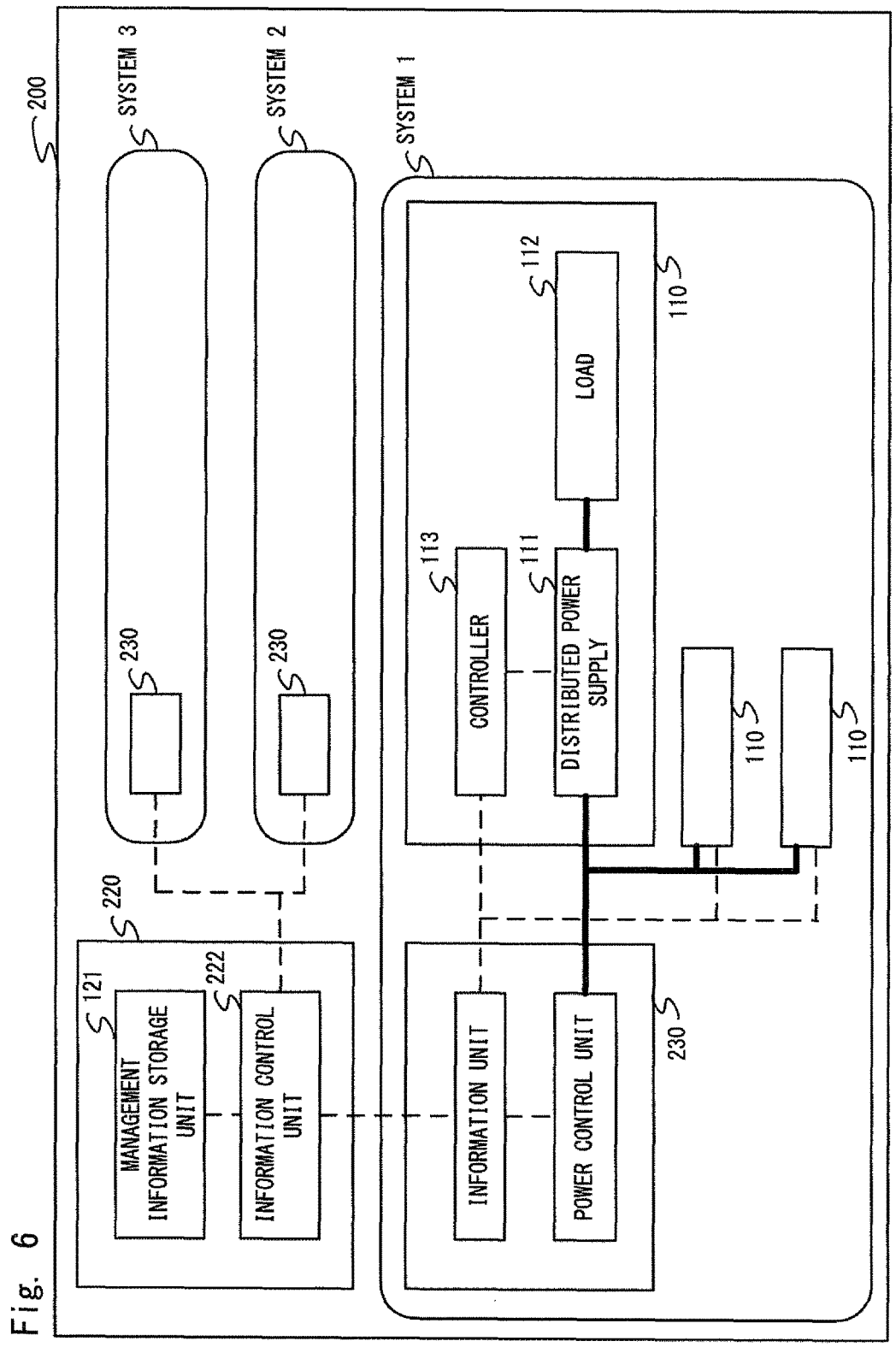
FIG. 6 is a diagram showing the configuration of a power accommodation system 200 according to a third embodiment.

FIG. 6 is a block diagram showing the configuration of a power accommodation system 200 according to the third embodiment. The configuration of the third embodiment is similar to that of the first embodiment unless otherwise specified. In particular, elements having the same configurations are given the same reference signs.

The power accommodation system 200 includes the power management apparatus 220, one or more power routers 230, and one or more consumer management apparatuses 110 connected to the power routers 230.

The power management apparatus 220 includes a management information storage unit 121 and an information control unit 222.

In addition to the functions of the information control unit 122 of the first embodiment, the information control unit 222 has a function of received power network information (to be discussed later) from the power routers 230 and recording such information in a power network table 1212 as the state of the power supply (B-1) and the power transmission distance (B-2), a function of calculating an optimum power transmission path when accommodating power, a function of notifying the power routers 230 of the power transmission paths and the amounts of transmission power, and a function of received the power transmission results from the power routers 230. That is, the information control unit 222 serves as a controller for the power routers 230.

The power routers 230 are connected to the bulk power system and the multiple consumer management apparatuses 110 via power transmission lines so that power can be transmitted or received therebetween. The information control unit 222 and consumer management apparatuses 110 are connected together by wire or wirelessly so that communication can be performed. The power routers 230 may be connected together via power transmission lines so that power can be transmitted or received and may be connected together by wire or wirelessly so that communication can be performed. The power routers 230 have a function of periodically checking the alive or dead state of the distributed power supplies 111 of the bulk power system and consumer management apparatuses 110 and notifying the information control unit 222 of the check results, a function of transmitting power on the basis of the power transmission paths and the amounts of transmission power received from the information control unit 222, and a function of notifying the information control unit 222 of the power transmission results.

Next, referring back to FIG. 3, a process in which the power accommodation system 200 accommodates power will be described. Only steps in the third embodiment different from those in the first embodiment will be described below. The steps in the third embodiment are similar to those in the first embodiment unless otherwise specified.

Information about a power accommodation contract and a power network is registered in a management information storage unit 121 (S101). An information control unit 222 receives information about the state of the power supply (B-1) and the distance (B-2 ) from a power router 230 and registers it in a power network table 1212.

The information control unit 222 controls the controller 112 of a consumer management apparatus 110 so that the consumer management apparatus 110 satisfies the condition defined in the form of the premium (A-3) (S102).

The information control unit 222 periodically checks whether the consumer management apparatus 110 satisfies the condition defined in the form of the option (A-4) (S103). Alternatively, the power router 230 may detect whether the condition has been satisfied and notify the information control unit 222 of the detection result.

When the consumer management apparatus 110 satisfies the condition defined in the form of the option (A-4), the information control unit 222 determines, from the other consumer management apparatuses 110, one or more consumer management apparatuses 110 (power transmission sources) which supply power to the consumer management apparatus 110 (power transmission destination) which must receive power, as well as determines optimum power transmission paths and the amounts of transmission power (S104).

If the power transmission destination and power transmission sources are connected to the same power router 230, that is, they are in the same system, power accommodation is performed as in the first embodiment via the power router 230.

Further, in the present embodiment, even if the power transmission destination and power transmission sources are connected to different power routers 230, that is, they are in different systems, power accommodation power can be performed. In this case, the power router 230 connected to the consumer management apparatus 110 serving as the power transmission source transmits power received from the power transmission sources to the other predetermined power router 230, which is connected to the consumer management apparatus 110 serving as the power transmission destination, under the path control of the information control unit 222. The other power router 230 supplies the received power to the power transmission destination.

The effects of the present embodiment will be described in a comparison with a configuration not using the power routers 230.

Figure 7:
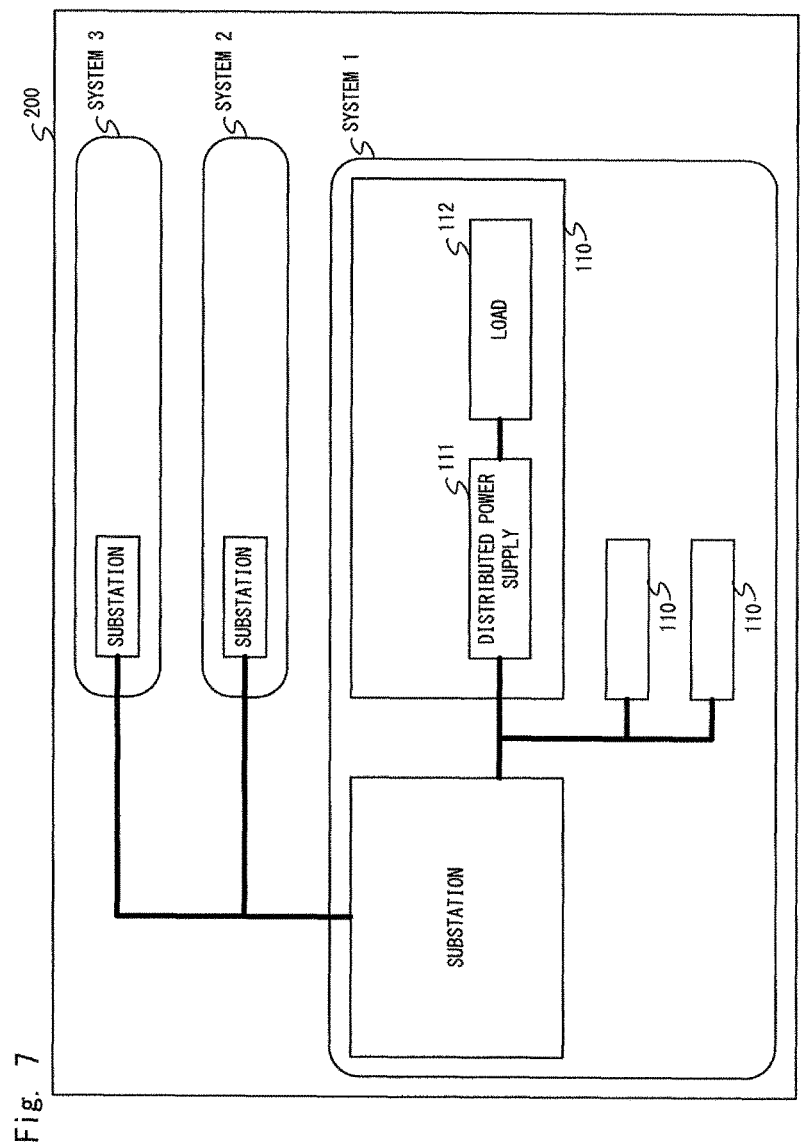
FIG. 7 is a diagram showing a configuration in which power is accommodated between different systems without using power routers 230.

FIG. 7 is a block diagram showing a configuration in which power is accommodated between different systems without using the power routers 230. In the example shown in FIG. 7, if power is accommodated between consumer management apparatuses 110 belonging to different systems, it is necessary to pass power through bulk power system facilities such as substations. Accordingly, flexible and quick power accommodation is difficult. Further, the power transmission efficiency becomes lower as the power transmission distance becomes longer between a system 1 to which the power transmission destination belongs and a system 2 to which the power transmission sources belong.

On the other hand, according to the configuration using the power routers 230 shown in FIG. 6, power trading performed through information communication and power accommodation performed through the power transmission network are separated. That is, although power is transmitted from the system 1 to the system 2 as trading, actual power is not necessarily transmitted directly from the system 1 to the system 2. Only the necessary energy is transmitted via an optimum power transmission path calculated by the information control unit 222. Accordingly, the power transmission efficiency can be increased compared to that of the example of FIG. 7. Further, power can be accommodated flexibly and quickly without having to pass power through the bulk power system.

As seen above, according to the present embodiment, flexible, quick, and efficient power accommodation can be realized regardless of the location of the consumer management apparatuses 110. That is, by using power routers, flexible power accommodation can be performed more precisely based on the reception conditions set by the consumers.

Other Embodiments

The present invention is not limited to the above embodiments, and various changes can be made thereto without departing from the spirit and scope of the invention, as a matter of course.

Figure 8:
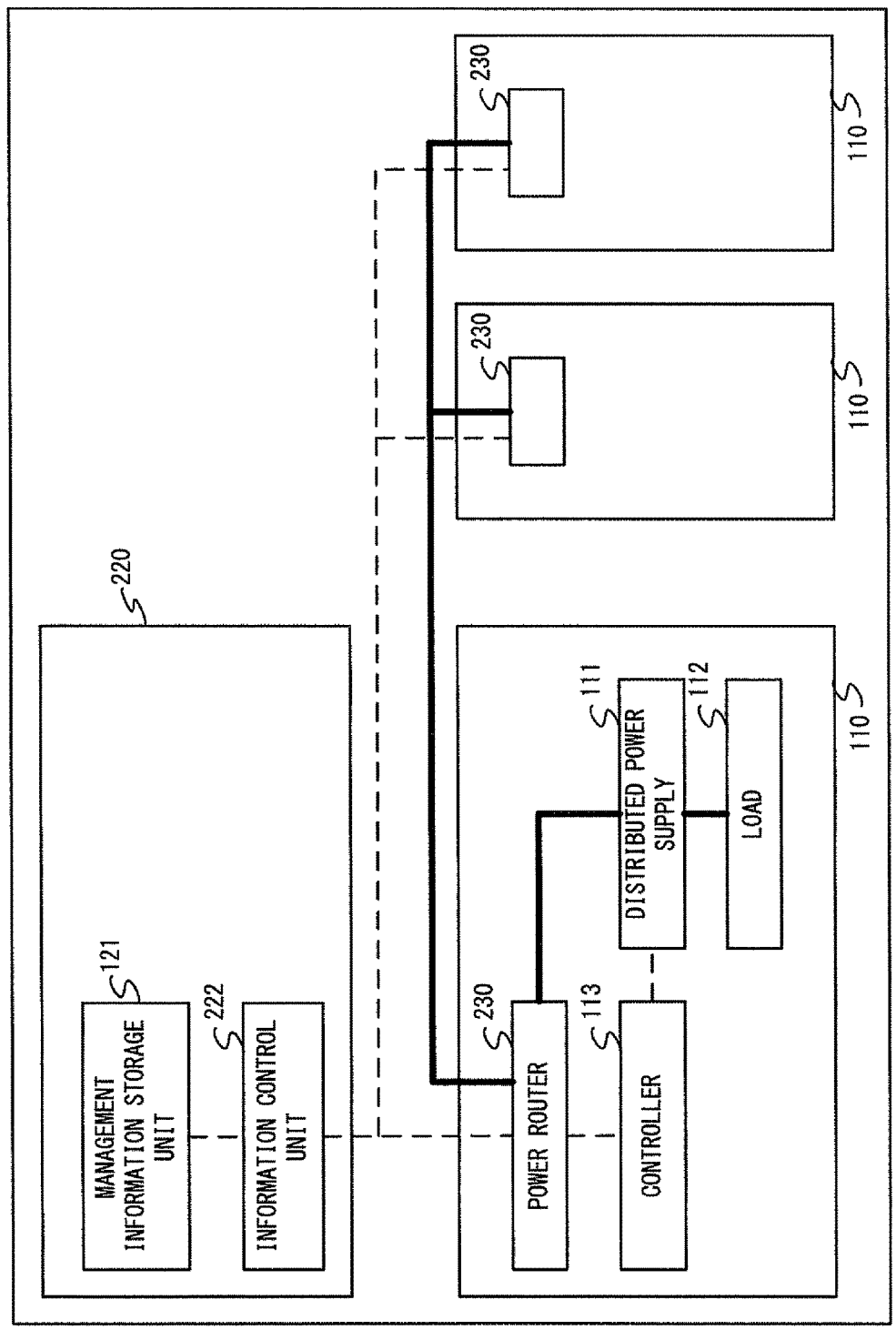
FIG. 8 is a diagram showing the configuration of a power accommodation system according to another embodiment.

For example, there may be employed a configuration as shown in FIG. 8, where each consumer management apparatus 110 includes a power router 230, and each power router 230 transmits power to another power router 230 via a path calculated by the information control unit 222, as shown in the second embodiment. Thus, power can be directly accommodated between the consumer management apparatuses 110.

While the configuration where the present invention is implemented principally using hardware has been described in the above embodiments, other configurations may be employed. Any process of the present invention may be implemented by causing a central processing unit (CPU) to execute a computer program. Such a computer program can be stored in various types of non-transitory computer-readable media and provided to a computer. Examples of the non-transitory computer-readable media include various types of tangible storage media. Examples of the non-transitory computer-readable media include magnetic storage media (e.g., flexible disks, magnetic tapes, hard disk drives), magneto-optical storage media (e.g., magneto-optical disks), compact disc read-only memories (CD-ROMs), CD-Rs, CD-R/Ws, semiconductor memories (e.g., mask ROMs, programmable ROMs (PROMs), erasable PROMs (EPROMs), flash ROMs, and random access memories (RAMs). The program may be provided to the computer by various types of transitory computer-readable media. Examples of the transitory computer-readable media include electric signals, optical signals, and electromagnetic waves. The transitory computer-readable media can provide the program for the computer via a wire communication path such as an electric line or optical fiber, or a wireless communication path.

While the invention of the present application has been described with reference to the embodiments, the invention is not limited thereto. Various changes understandable by those skilled in the art can be made to the configuration or details of the invention of the present application without departing from the scope of the invention.

The present application claims priority based on Japanese Patent Application No. 2012-225987, filed on Oct. 11, 2012, the disclosure of which is incorporated herein in its entirety.

REFERENCE SIGNS LIST 100 power accommodation system
110 consumer management apparatus
111 distributed power supply
112 load
113 controller
120 power management apparatus
121 management information storage unit
1211 consumer table
1212 power network table
1213 accommodation control table
122 information control unit
123 power control unit
200 power accommodation system
220 power management apparatus
222 information control unit
230 power router

The invention claimed is:

1. A power accommodation system comprising:
a plurality of consumer management apparatuses forming an autonomously controlled grid; and
a power management apparatus that accommodates power among the consumer management apparatuses,
wherein the power management apparatus comprises:
a management information storage unit that stores information related to at least one of first and second conditions in such a manner that the at least one condition is associated with each of the consumer management apparatuses, the first condition being a condition under which each of the consumer management apparatuses receives power, the second condition being a condition under which each of the consumer management apparatuses supplies power,
a power control unit that supplies or receives power to or from the consumer management apparatuses; and
an information control unit that controls the consumer management apparatuses and the power control unit,
when the information control unit detects that a first consumer management apparatus is operating in the first condition, the information control unit requests a second consumer management apparatus operating in the second condition to supply power,
the power control unit supplies power supplied from the second consumer management apparatus to the first consumer management apparatus,
the consumer management apparatuses each comprise at least one of a distributed power supply that generates power and a load that consumes power, and
a controller that controls the distributed power supply, and
the controller controls power supply to the power management apparatus based on a request from the information control unit and received power from the power control unit.

2. The power accommodation system according to claim 1, wherein
the first condition further comprises energy to be received by each of the consumer management apparatuses, and
the information control unit determines other one or more consumer management apparatuses which should supply power to the first consumer management apparatus and the energy to be supplied by each of the other one or more consumer management apparatuses based on the energy to be received.

3. The power accommodation system of claim 1, wherein the second condition further comprises the energy that each of the consumer management apparatuses can supply, and the controller of each of the consumer management apparatuses drives the distributed power supply in a state in which a reserve generating capacity corresponding to the energy which can be supplied is reserved and causes the distributed power supply to generate power based on the energy which can be supplied, in response to a request from the information control unit.

4. The power accommodation system of claim 3, wherein when the information control unit detects that the first consumer management apparatus driving the distributed power supply in a state in which a reserve generating capacity corresponding to the energy which can be supplied is reserved is operating in the first condition, the information control unit supplies power preferentially to the first consumer management apparatus.

5. The power accommodation system of claim 1, wherein the power control unit is a power router capable of outputting received power to one or more specified destinations in specified amounts.

6. The power accommodation system according to claim 5, wherein
the power accommodation system comprises a plurality of power routers connected to one another so that power can be transmitted or received therebetween,
when the information control unit detects that the first consumer management apparatus capable of transmitting or receiving power to or from a first power router is operating in the first condition, the information control unit determines the second consumer control apparatus that can transmit or receive power to or from a second power router is operating in the second condition, calculates a power transmission path from the second power router to the first power router, and notifies said first and second power routers on the power transmission path of the power transmission path, and
said first and second power routers transmit power via the power transmission path.

7. A method for accommodating power used in a power accommodation system, the system comprising a plurality of consumer management apparatuses forming an autonomously controlled grid and a power management apparatus that accommodates power among the consumer management apparatuses, the method comprising:

detecting, by an information control unit of the power management apparatus, that a first consumer management apparatus is operating in a first condition which is a condition under which each of the consumer management apparatuses receives power;

requesting, by the information control unit of the power management apparatus, a second consumer management apparatus operating in the second condition to supply power when the information control unit detects that the first consumer management apparatus is operating in a first condition, wherein the second operating condition is a condition under which each of the consumer management apparatuses supplies power; and receiving, by power control unit of the power management apparatus, the power from the second consumer management apparatus and supplying the power to the first consumer management apparatus.

8. The method for accommodating power according to claim 7, wherein the first condition further comprises energy to be received by each of the consumer management apparatuses, and the requesting includes determining, by the information control unit, other one or more consumer management apparatuses which should supply power to the first consumer management apparatus and the energy to be supplied by each of the other one or more consumer management apparatuses, based on the energy to be received.

9. The method for accommodating power according to claim 7, wherein the second condition further comprises the energy that each of the consumer management apparatuses can supply, the method further comprising:

causing, by a controller of each of the consumer management apparatuses, the distributed power supply to drive the distributed power supply in a state in which a reserve generating capacity corresponding to the energy which can be supplied is reserved; and in response to the requesting, causing, by the controller of each of the consumer management apparatuses, the distributed power supply to generate power based on the energy that can be supplied.

10. The method for accommodating power according to claim 9, wherein when, the supplying includes detecting, by the information control unit, that the first consumer management apparatus driving the distributed power supply is in a state in which a reserve generating capacity corresponding to the energy which can be supplied is reserved, is operating in the first condition, the information control unit supplies power preferentially to the first consumer management apparatus.

11. The method for accommodating power according to claim 7, wherein the power control unit is a power router capable of outputting received power to one or more specified destinations in specified amounts.

12. The method for accommodating power according to claim 9, wherein a plurality of power routers are connected to one another so that power can be transmitted or received therebetween, in the detecting step, the information control unit detects that the first consumer management apparatus capable of transmitting or receiving power to or from a first power router is operating in the first condition, and in the requesting step, the information control unit determines the second consumer control apparatus that can transmit or receive power to or from a second power router is operating in the second condition, calculates a power transmission path from the second power router to the first power router, and notifies said first and second power routers on the power transmission path of the power transmission path, and in the supplying step, said first and second power routers transmit power via the power transmission path.

13. A non-transitory computer-readable medium storing a program that, when executed by a computer, causes the computer to perform the method according to claim 7.

* * * * *